United States Patent
Chao (10) Patent No.: US 9,533,278 B2
(45) Date of Patent: Jan. 3, 2017

(54) PATTERNED DEPOSITION OF LIQUID FILMS FOR BIOMEDICAL DEVICES

(71) Applicant: Applied Materials, Inc., Santa Clara, CA (US)

(72) Inventor: Hann-Ching Chao, San Carlos, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 0 days.

(21) Appl. No.: 14/801,564

(22) Filed: Jul. 16, 2015

(65) Prior Publication Data
US 2016/0038902 A1    Feb. 11, 2016

Related U.S. Application Data (60) Provisional application No. 62/035,133, filed on Aug. 8, 2014.

(51) Int. Cl.
| | |
|---|---|
| *B05D 3/10* | (2006.01) |
| *G01N 33/53* | (2006.01) |
| *B01J 16/00* | (2006.01) |
| *B01J 19/00* | (2006.01) |

(52) U.S. Cl.
CPC ... *B01J 19/0046* (2013.01); *B01J 2219/00596* (2013.01)

(58) Field of Classification Search
CPC ............................ B01J 19/0046; G01N 33/53
USPC ......................... 427/2.1, 282, 261, 271, 337
See application file for complete search history.

(56) References Cited

U.S. PATENT DOCUMENTS

| | | | |
|---|---|---|---|
| 6,245,297 B1 | 6/2001 | Kowallis | |
| 6,296,702 B1 | 10/2001 | Bryning et al. | |
| 6,746,946 B2 | 6/2004 | Berg | |
| 8,287,939 B2* | 10/2012 | Goshoo ............... | B01J 19/0046 427/2.1 |
| 2006/0073610 A1* | 4/2006 | Kopaciewicz ....... | B01J 19/0046 436/518 |
| 2006/0134657 A1* | 6/2006 | Hodko ................ | C12Q 1/6825 435/6.18 |
| 2006/0141527 A1* | 6/2006 | Caracci ............... | B01J 19/0046 435/7.1 |

(Continued)

FOREIGN PATENT DOCUMENTS

| | | |
|---|---|---|
| WO | 2005-038048 A1 | 4/2005 |
| WO | 2009-119972 A2 | 10/2009 |

OTHER PUBLICATIONS

International Search Report and Written Opinion of related application PCT/US2015/040788 dated Sep. 25, 2015.

*Primary Examiner* — Cachet Sellman
(74) *Attorney, Agent, or Firm* — Patterson & Sheridan, LLP (57) ABSTRACT

Embodiments described herein generally relate to a method for deposition of a biofunctionalizing material, such as for the production of a biomedical device. The method can include positioning a substrate on a substrate support, the substrate having a plurality of wells formed therein. A printing mask is positioned over the substrate, the printing mask having a plurality of mask openings, the plurality of mask openings corresponding to the plurality of wells. A biofunctionalizing material is then deposited through the printing mask and into the wells, the biofunctionalizing material being guided by the plurality of mask openings, the biofunctionalizing material forming a layer over a bottom surface of the plurality of wells.

20 Claims, 5 Drawing Sheets

(56) References Cited

U.S. PATENT DOCUMENTS

2007/0148416 A1 6/2007 Wolkin et al.
2010/0190170 A1* 7/2010 Yu ..................... B01L 3/50853
 435/6.13

* cited by examiner

PATTERNED DEPOSITION OF LIQUID FILMS FOR BIOMEDICAL DEVICES

CROSS-REFERENCE TO RELATED APPLICATIONS

This application claims priority to U.S. Provisional Patent Application Ser. No. 62/035,133, filed on Aug. 14, 2014, which is incorporated by reference herein.

BACKGROUND

Field

Embodiments described herein generally relate to methods and apparatus for forming a biomedical device. More particularly, embodiments provide methods of depositing a biofunctionalizing material in an opening in the production of a biomedical device.

Description of the Related Art

The detection of specific nucleic acids is an important tool for diagnostic medicine and molecular biology research. Gene probe assays currently play roles in identifying infectious organisms such as bacteria and viruses, in probing the expression of normal and mutant genes and identifying mutant genes such as oncogenes, in typing tissue for compatibility preceding tissue transplantation, in matching tissue or blood samples for forensic medicine, and for exploring homology among genes from different species. Recent advances include the fabrication of biomedical devices, such as DNA sequencing chips and microfluidic chips, with gene probes incorporated therein.

In the fabrication of these biomedical devices, biofunctionalizing materials can be used in positioning and immobilizing the gene probes. Biofunctionalizing material, when in a liquid state, often needs to be deposited into patterned regions (e.g., vias or wells). Liquid films of the biofunctionalizing material are generally deposited in a blanket fashion. Once deposited, a subsequent removal/clean step, such as chemical mechanical polishing (CMP), is needed to remove the material from the interstitial areas in between the patterned regions.

However, there are a number of disadvantages to the use of CMP subsequent removal/clean steps. First, CMP may damage wells formed on the substrate. Further, CMP creates particulates, which must be removed. However, current protocols do not have the precision such that the subsequent removal/clean step can be avoided.

Therefore, a there is a need for methods for depositing a biofunctionalizing material with increased precision and a reduced clean requirement.

SUMMARY

Embodiments described herein generally provide methods for forming a biomedical device. More particularly, embodiments described herein provide methods for deposition of a biofunctionalizing material into openings formed on a substrate.

In one embodiment, a method of depositing a material can include positioning a substrate on a substrate support, the substrate having a plurality of wells formed therein; positioning a printing mask over the substrate, the printing mask having a plurality of mask openings, the plurality of mask openings corresponding to the plurality of wells; and depositing a biofunctionalizing material through the printing mask and into the wells, the biofunctionalizing material being guided by the plurality of mask openings, the biofunctionalizing material forming a layer over a bottom surface of the plurality of wells.

In another embodiment, a method of depositing a material can include positioning a substrate on a substrate support, the substrate having a plurality of wells; aligning a printing mask over the substrate, the printing mask having a plurality of mask openings, the mask openings corresponding to and aligning with at least one of the plurality of wells; coating the printing mask with a biofunctionalizing material; and extruding the biofunctionalizing material through the plurality of mask openings, the mask openings being positioned to deposit the biofunctionalizing material into the wells.

In another embodiment, a method of depositing a material can include positioning a substrate on a substrate support, the substrate having a plurality of wells formed therein, the substrate comprising a plurality of layers with the top layer being a silicon-containing layer, the plurality of wells extending through at least the silicon-containing layer, each of the plurality of wells having a first width, a first length and comprising a silanized layer formed on the bottom surface; positioning a printing mask over the substrate, the printing mask having a plurality of mask openings, the plurality of mask openings corresponding to the wells, wherein the plurality of mask openings and the plurality of wells each have a circumference, and wherein the circumference of the mask opening is less than the corresponding circumference of the well; and depositing a hydrogel through the printing mask and into the wells, the hydrogel being guided by the plurality of mask openings, the hydrogel forming a layer over silanized layer in the plurality of wells.

BRIEF DESCRIPTION OF THE DRAWINGS

So that the manner in which the above-recited features of the present disclosure can be understood in detail, a more particular description of the methods and apparatus, briefly summarized above, may be had by reference to embodiments, some of which are illustrated in the appended drawings. It is to be noted, however, that the appended drawings illustrate only typical embodiments of this methods and apparatus and are therefore not to be considered limiting of its scope, for the methods and apparatus may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the present disclosure provide apparatus and methods for printing a single layer or multilayer pattern in an opening of a substrate. In one embodiment, a system is provided for a single layer or multilayer printing process on a substrate. The system may be a masked printing system that is adapted to perform a masked printing process within a portion of a biomedical device production line in which one or more openings are formed in a substrate, a biofunctionalizing material is deposited and the substrate is then processed in one or more subsequent processing chambers. In one embodiment, the masked printing system is a screen printing system available from Baccini S.p.A., which is owned by Applied Materials, Inc. of Santa Clara, Calif.

Figure 1:
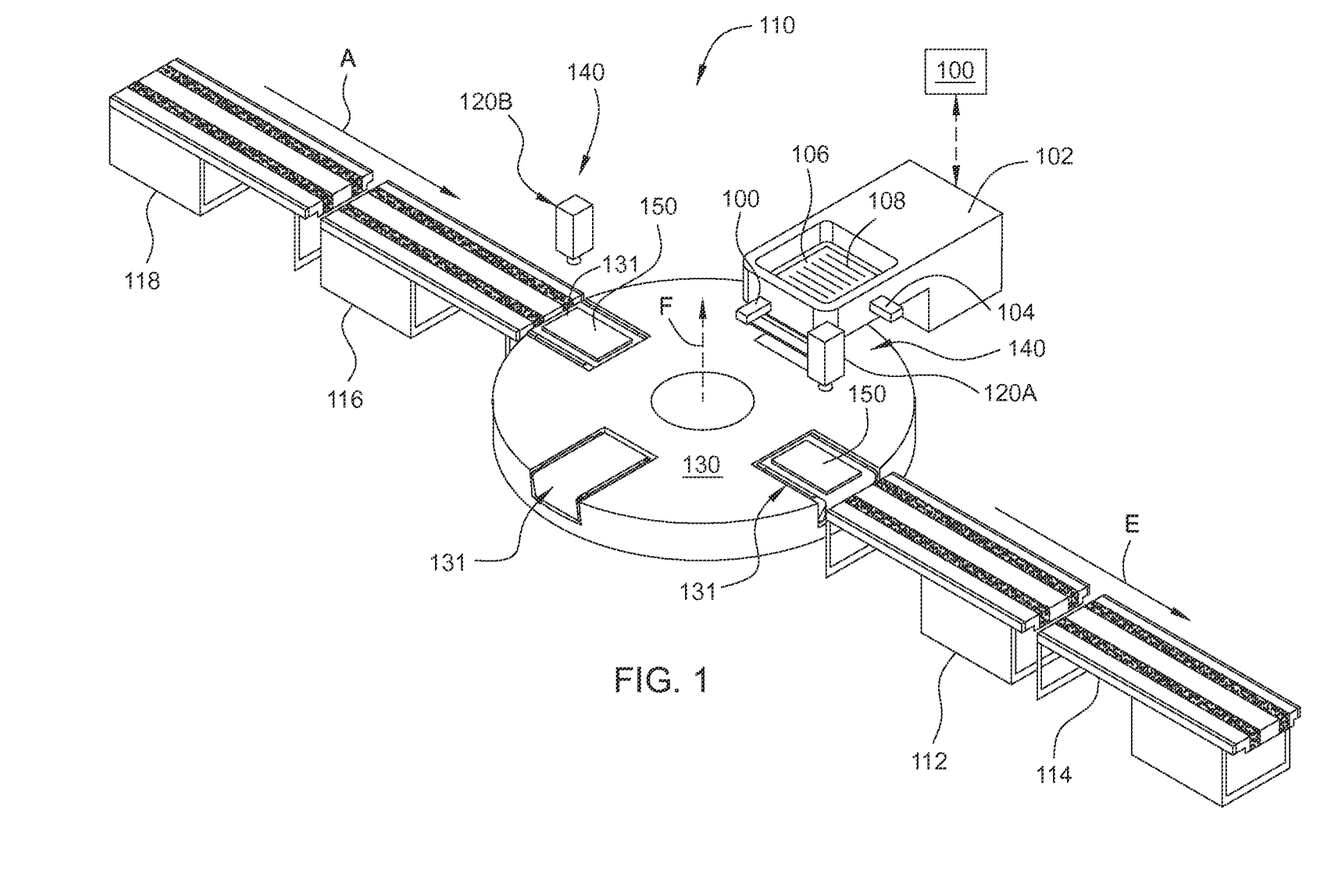
FIG. 1 is a schematic isometric view illustrating one embodiment of a masked printing system.

FIG. 1 is a schematic isometric view illustrating one embodiment of a masked printing system 110. The masked printing system 110 as described herein may include either screen printing or masked jetting of a material. Screen printing uses a secondary device, such as a squeegee, to spread material through a mask, such as a printing mask, to deposit a material. Masked jetting is a jet of material (e.g., thermal drop-on-demand (DOD), piezoelectric DOD or other pressurization method) delivered through a mask, such as a printing mask. In further embodiments, the material can be delivered by a pressurized spray or other accurate dispense method (e.g., an electronic pipette). The masked printing system 110 may be utilized in conjunction with embodiments described herein to deposit a biofunctionalizing material in features formed in a surface of a biomedical device 150.

The masked printing system 110 has an incoming conveyor 116, an actuator assembly 130, which is configured as a rotary actuator table or rotary transfer device in this embodiment, a screen print device 102, and an outgoing conveyor 112. The incoming conveyor 116 has a moving surface that may be configured to receive a biomedical device 150 from an input device, such as an input conveyor 118 (i.e., path "A"), and transfer the biomedical device 150 to a printing nest 131 coupled to the actuator assembly 130. In one aspect, the printing nest 131 comprises a substrate shuttle that provides positioning of a biomedical device 150 thereon relative to a print head in the screen print device 102. The outgoing conveyor 112 may be configured to receive a processed biomedical device 150 from a printing nest 131 coupled to the actuator assembly 130 and transfer the biomedical device 150 to a substrate removal device, such as an exit conveyor 114. The input conveyor 118 and the exit conveyor 114 may be automated substrate handling devices that are part of a larger production line.

The actuator assembly 130 may be rotated and angularly positioned about the "F" axis by a rotary actuator (not shown) and a system controller 100, such that the printing nests 131 may be selectively angularly positioned within the masked printing system 110. The actuator assembly 130 may also have one or more supporting components to facilitate the control of the printing nests 131 or other automated devices used to perform a substrate processing sequence in the masked printing system 110.

In one embodiment, the actuator assembly 130 includes four printing nests 131 formed into an upper surface 140, also known as substrate supports. The printing nests 131 are each adapted to support a biomedical device 150 during the masked printing process performed within the screen print device 102. FIG. 1 schematically illustrates the position of the actuator assembly 130 in which one printing nest 131 is in position "1" to receive a biomedical device 150 from the incoming conveyor 116, another printing nest 131 is in position "2" within the screen print device 102 so that another biomedical device 150 can receive a screen printed pattern on a surface thereof, another printing nest 131 is in position "3" for transferring a processed biomedical device 150 to the outgoing conveyor 112, and another printing nest 131 is in position "4", which is an intermediate stage between position "1" and position "3".

The screen print device 102 is adapted to deposit material in a desired pattern on the surface of a biomedical device 150 positioned on a printing nest 131 in position "2" during the masked printing process. In one embodiment, the screen print device 102 includes a plurality of actuators, for example, actuators 104 (e.g., stepper motors or servomotors) that are in communication with the system controller 100 and are used to adjust the position and/or angular orientation of a printing mask 106 disposed within the screen print device 102 with respect to the biomedical device 150 being printed. In another embodiment, the printing nest 131 may be utilized to position the biomedical device 150 relative to the printing mask 106 based on instructions from the system controller 100. The printing nest 131 may be utilized to move the biomedical device 150 radially (towards or away from the F axis of the actuator assembly 130). The actuator assembly 130 may also be rotated about the F axis to adjust the angular position of the printing nest 131 (and the biomedical device 150 positioned thereon). Positioning of the printing nest 131 and biomedical device 150 may be based on calculations performed in the system controller 100 based on acquired images of the biomedical device 150, or a screen printed layer on the biomedical device 150.

The printing mask 106 may be a firm but flexible composite, such as a plastic or stainless steel. The printing mask 106 may be coated with a hydrophobic layer. In one embodiment, the printing mask 106 is a metal sheet or plate with a plurality of mask openings 108, such as holes, slots, or other apertures formed therethrough to define a pattern and placement of screen printed material (e.g., biomaterial) on a surface of a biomedical device 150. In another embodiment, the screen print mask 106 can contour to the shape of the biomedical device 150, such that a seal is formed between the biomedical device 150 and the printing mask 106. In general, the screen printed pattern that is to be deposited on the surface of a biomedical device 150 is aligned to the biomedical device 150 in an automated fashion by orienting the printing mask 106 in a desired position over the surface of the biomedical device 150 using the actuators 104 and information received by the system controller 100 from one or more inspection devices, shown here as inspection devices 120A and 120B. In one embodiment, the screen print device 102 is adapted to deposit a biocompatible material in openings of a biomedical device 150. The openings can have a width of less than 3 µm, such as an opening of about 1 µm. In one embodiment, the screen print device 102 is adapted to deposit a hydrogel in the openings of the biomedical device 150 to form a hydrogel layer on a lower surface of the opening in a biomedical device 150. The biomedical device 150 and the wells are described in greater detail in FIGS. 2A-2I and 3 below.

The system controller 100 facilitates the control and automation of the overall masked printing system 110 and may include a central processing unit (CPU) (not shown), memory (not shown), and support circuits (or I/O) (not shown). The CPU may be one of any form of computer processors that are used in industrial settings for controlling various chamber processes and hardware (e.g., conveyors, optical inspection assemblies, motors, fluid delivery hardware, etc.) and monitor the system and chamber processes (e.g., substrate position, process time, detector signal, etc.). The memory is connected to the CPU, and may be one or more of a readily available memory, such as random access memory (RAM), read only memory (ROM), floppy disk, hard disk, or any other form of digital storage, local or remote. Software instructions and data can be coded and stored within the memory for instructing the CPU. The support circuits are also connected to the CPU for supporting the processor in a conventional manner. The support circuits may include cache, power supplies, clock circuits, input/output circuitry, subsystems, and the like. A program (or computer instructions) readable by the system controller 100 determines which tasks are performable on a substrate. Preferably, the program is software readable by the system controller 100, which includes code to generate and store at least substrate positional information, the sequence of movement of the various controlled components, substrate optical inspection system information, and any combination thereof. In one embodiment of the present methods and apparatus, the system controller 100 includes pattern recognition software to resolve the positions of features formed in the substrate and/or alignment marks, if present.

FIGS. 2A-2I depict a process sequence to form a biomedical device 150 with a biofunctionalizing material 218 deposited in a well, according to an embodiment. The biomedical device 150 shown includes a substrate 202. The substrate 202 can have any composition useable for biomedical device applications, such as a silicon, epoxy or quartz substrate. In one example, the substrate 202 is substantially composed of silicon. The substrate 202 can be of a broad range of dimensions (e.g., length, width, shape, thickness, etc.). In one example, the substrate is either a 200 millimeter (mm) substrate or a 300 mm substrate. In another example, the substrate is a glass slide of a typical 96 well plate form-factor (e.g., about 85 mm by about 127 mm). In another example, the substrate can be any number of dimensions to optimize production of the device (e.g., Gen 2 LCD glass with dimensions of about 360 mm by about 465 mm).

Figure 2A:
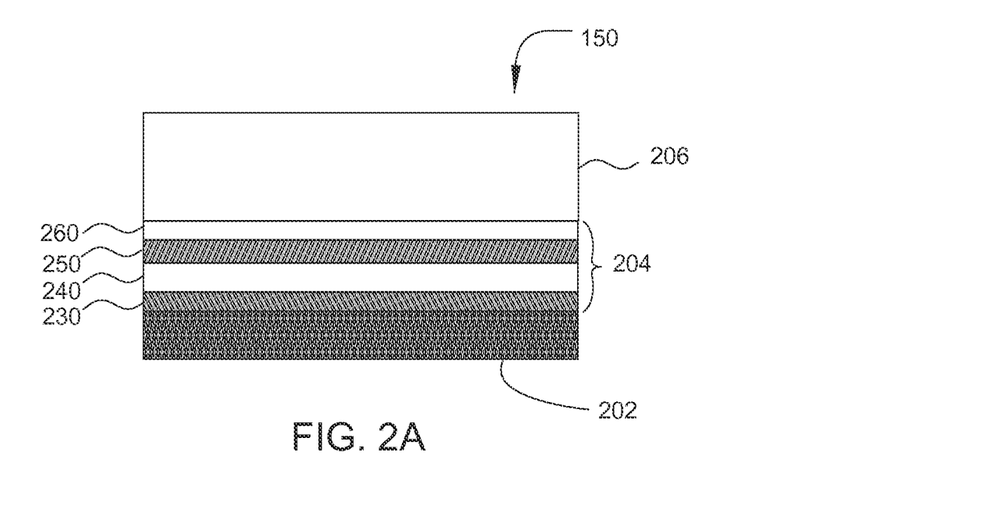
FIGS. 2A-2I depict the deposition of a biofunctionalizing material in a biomedical device, according to an embodiment.

FIG. 2A depicts early stage formation of a biomedical device 150 including the substrate 202 with a plurality of layers 204 formed thereon. The plurality of layers 204 includes a first layer 230, a second layer 240, a third layer 250 and a fourth layer 260. The first layer 230 is a dielectric layer, such as a silicon oxide layer, a silicon nitride layer, a silicon oxynitride or others. The first layer 230 can be deposited using a chemical vapor deposition process, such as plasma enhanced chemical vapor deposition (PE-CVD). The second layer 240 is a color filter layer. The color filter layer may be composed of a material, which is transparent to at least one wavelength of light while being opaque to at least one wavelength of light. The third layer 250 is a dielectric layer, such as a silicon oxide layer, a silicon nitride layer, a silicon oxynitride or others. The third layer 250 can be deposited using methods similar to the first layer 230, such as by PE-CVD. The third layer 250 is deposited at low temperatures (LT). In one example, LT layers, such as the third layer 250, are deposited at a temperature of less than about 100 degrees Celsius. In another example, LT layers are deposited at a temperature low enough that the second layer 240 is not damaged. The fourth layer 260 is a metal-containing layer, such as a tantalum oxide layer, a tungsten oxide layer, a hafnium oxide layer or others. The metal-containing layer can be deposited by deposition techniques known in the art. In one example, a tantalum oxide layer is deposited using atomic layer deposition (ALD). The plurality of layers 204 may include any composition used in the formation of a biomedical device, such as metals or dielectrics.

Figure 2B:
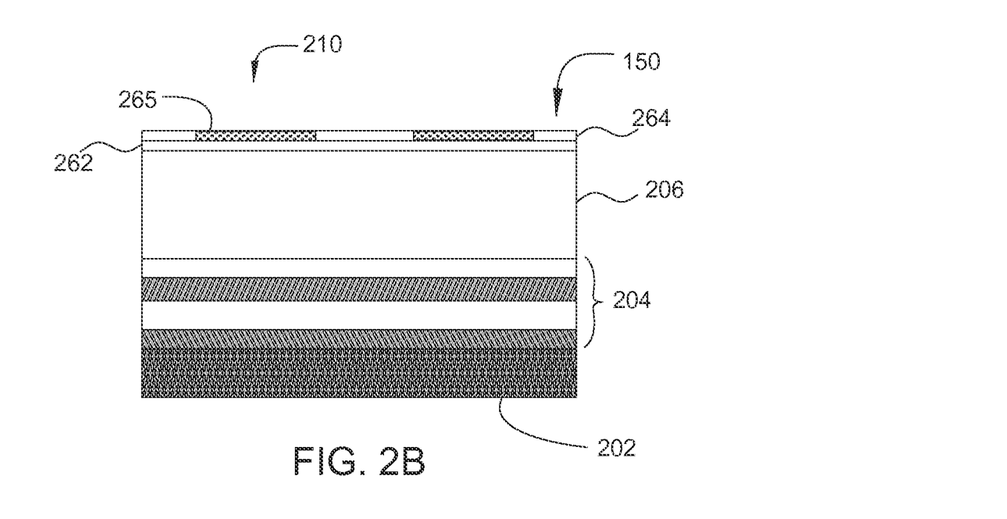

FIG. 2B depicts the substrate 202 with a dielectric layer 206 formed over the plurality of layers 204. The dielectric layer 206 can be made of a dielectric material, such as silicon nitride. The dielectric layer 206 is etched or otherwise processed to form one or more openings therein to define a plurality of wells 210. The dielectric layer 206 can be etched using known etching techniques compatible with the materials and feature dimensions. The dielectric layer 206 is shown here as having a hardmask 262 and a photoresist 264 formed over the dielectric layer 206. The hardmask 262 and the photoresist 264 provide the pattern for etching the dielectric layer 206. The photoresist 264 receives radiation, which creates one or more susceptible portions 265 of the photoresist 264, shown here as two susceptible portions 265. The susceptible portions 265 are susceptible to etching by one or more etchants (not shown). The etchants are then delivered to etch the photoresist 264, the hardmask 262 and the layers 204, which forms a plurality of wells 210. With the plurality of wells 210 formed, the hardmask 262 and the photoresist 264 are then removed.

Figure 2C:
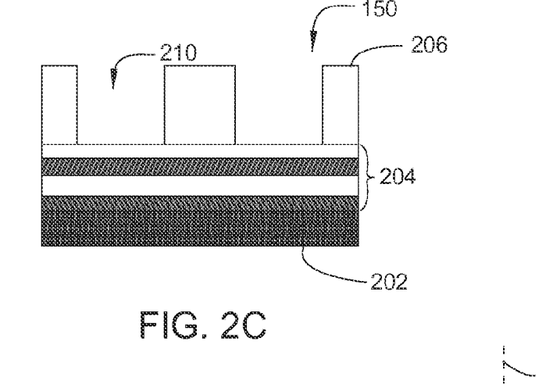

FIG. 2C depicts the substrate 202 with the dielectric layer 206 having the plurality of wells 210 formed therein. The plurality of wells 210 can have a width of less than 3 μm, such as an opening of about 1 μm. The plurality of wells 210 can be a variety of shapes, such as cylindrical.

The plurality of wells 210 form the boundaries for the deposition of other biological components and form the environment in which biological investigations can be conducted. Biological components can include polynucleotides and whole cell lysates, among others. In this example, the plurality of wells 210 extend through the dielectric layer 206 and stop at the fourth layer 260.

Figure 2D:
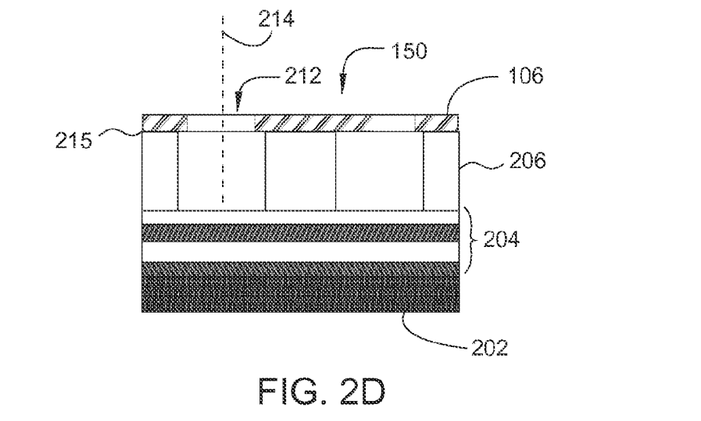

FIG. 2D depicts the biomedical device 150 with the printing mask 106 positioned over the substrate 202 and in contact with the dielectric layer 206. The printing mask 106 has a plurality of mask openings 212, which correspond to the wells 210 formed on the biomedical device 150. The plurality of mask openings 212 have a general dimension, which is, less than the dimensions of the plurality of wells 210. Shown here, the plurality of wells 210 each have a diameter of about 1 μm and the plurality of mask openings 212 each have a diameter of less than 1 μm.

The plurality of mask openings 212 shown here correspond to the plurality of wells 210. However, there may be more or fewer mask openings of the plurality of mask openings 212 positioned over the plurality of wells 210. Further, though depicted here as a 1:1 ratio of corresponding mask openings to corresponding wells, more than one mask opening may correspond to a single well 210 of the plurality of wells 210. Further, additional mask openings 212 corresponding to a single well 210 may be used to provide air relief during the deposition process. The plurality of mask openings 212 may each be positioned centrally with respect to a center line 214 or the plurality of mask openings 212 may be positioned off center with respect to the center line 214. Further, there may be combinations of mask openings both centered and off center in the plurality of mask openings 212. Further, the plurality of mask openings 212 may differ in size and shape. Shown here, the mask opening 212, which is positioned centrally, has a diameter, which is larger than the mask opening 212, which is positioned off-center.

The printing mask 106 can form a seal 215 with the dielectric layer (or other upper layer) of the biomedical device 150. Shown here, the seal 215 is formed between the dielectric layer 206 and the printing mask 106. In the presence of a seal 215, a second mask opening 212 may be used to allow air to escape to facilitate flow of material into the wells. In embodiments without a seal formed at the upper surface of the device, gases can escape from the wells along the upper surface of the substrate.

Figure 2E:
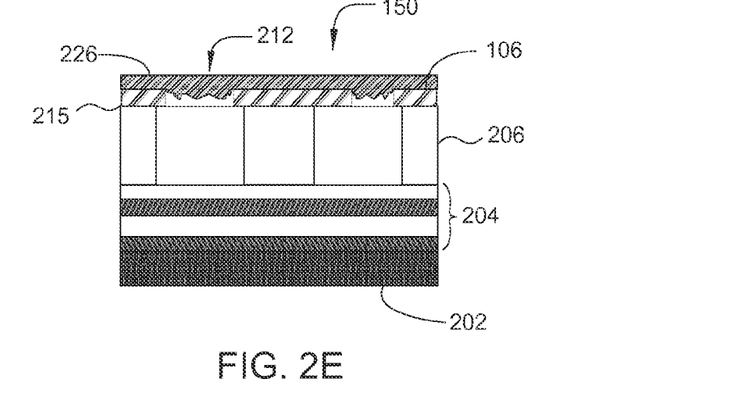

FIG. 2E depicts a silane compound 226 introduced over the printing mask 106 for delivery through the mask openings and into the wells. Although described here as a screen printing deposition, masked jetting may also be employed to deposit the silane compound 226 through the mask openings. The silane compound 226 can be delivered through the printing mask 106 and into the plurality of wells 210. The silane compound 226 may react with the underlying layer (e.g., the fourth layer 260) to form a silanized layer 208 therein. The silane compound 226 can be urged through the printing mask 106, such as by using backside pressure.

Figures 2F, 2G, 2H, 2I:
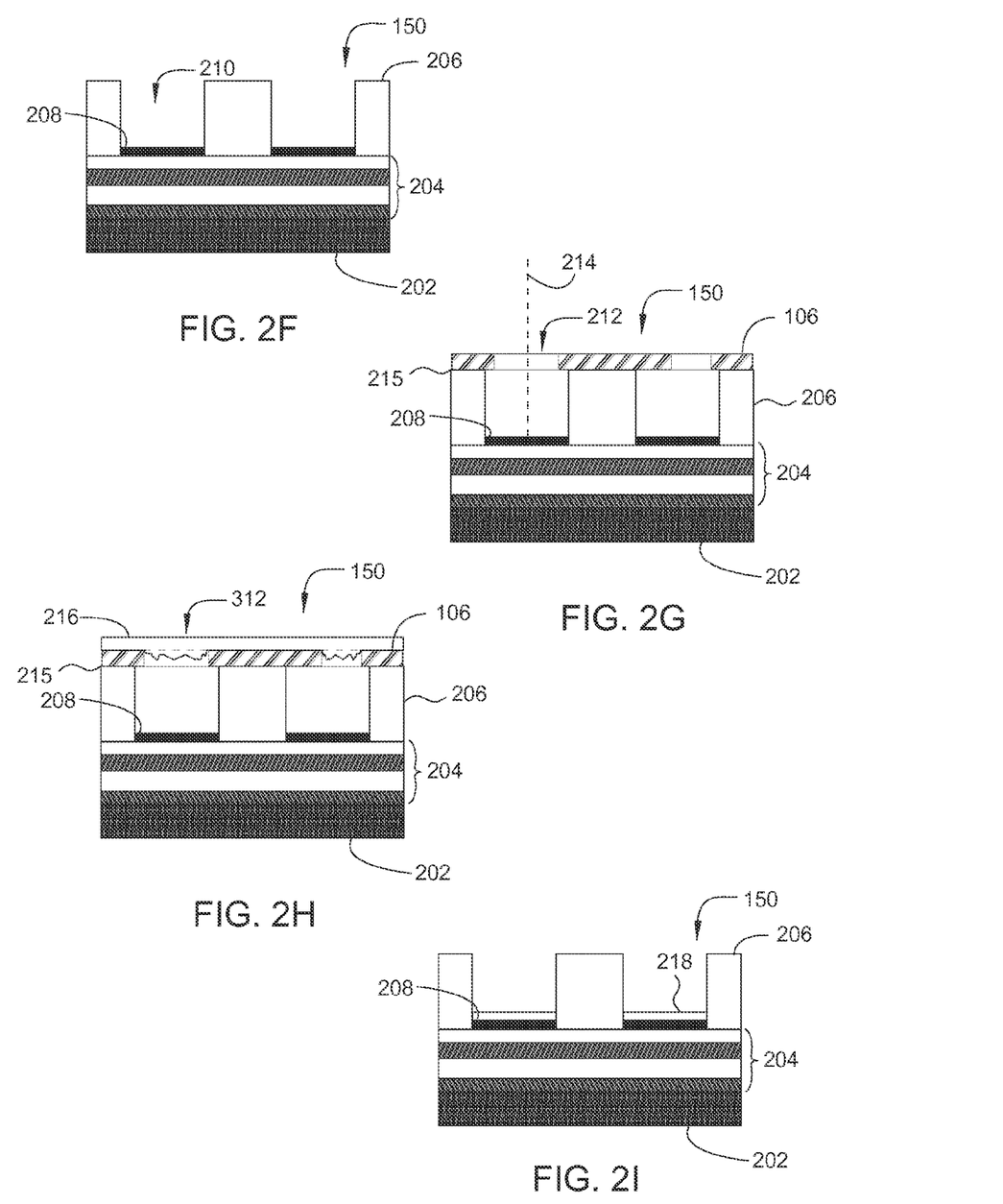

FIG. 2F depicts the biomedical device with a silanized layer 208 formed on the bottom of a well. Silanization involves the covalent bonding of a silane reagent (e.g., the silane compound 226) to a surface displaying hydroxyl groups (i.e., silica, mica) or to another silane molecule through formation of a siloxane bond. The silanized layer 208 is created by a process of covering the surface of an underlying layer (e.g., the fourth layer 260 comprising tantalum oxide) with the silane reagent, such as an organofunctional alkoxysilane. Components of the plurality of layers 204, such as silicon oxide and metal oxide surfaces, can receive the silanized layer 208, because they contain hydroxyl groups which displace the alkoxy groups on the silane reagent thus forming a covalent —Si—O—Si— bond. Thus, the silanized layer 208 creates a bond across the interface between the underlying layer of the plurality of layers 204 and biological components. Shown here, the printing mask 106 is removed after the deposition of the silanized layer 208. However, the printing mask 106 may be left in position for further processing, such as for the deposition of a biofunctionalizing material, as described below. Further, silanized layer 208 can be deposited by other methods than described in FIGS. 2E and 2F, such that the bottom portion of the well receives the silane compound 226. In one example, the silane compound 226 is delivered without the use of screen printing or masked jetting, such as by coating the substrate.

FIG. 2G depicts the biomedical device 150 with the printing mask 106 positioned in connection with the dielectric layer 206 and over the silanized layer 208. The positioning, structure and design of the printing mask 106 may be the same as described with reference to FIG. 2D.

FIG. 2H depicts the biomedical device 150 with a biofunctionalizing material 216 introduced over the printing mask 106. The biofunctionalizing material 216 can be delivered through the printing mask 106 and into the plurality of wells 210. As described above, the biofunctionalizing material 216 can be delivered through the printing mask 106 by screen printing or masked jetting. Examples of biofunctionalizing material include hydrogels (e.g., polyacrylamide gel), polynucleotide precursors (e.g., nucleotide triphosphates, primers, etc.) or other materials, which provide structure or function to a biomedical device.

FIG. 2I depicts the biomedical device 150 with a biofunctionalizing layer 218 formed over the silanized layer 208. With the biofunctionalizing layer 218 formed, the printing mask 106 can be removed from the biomedical device 150. The biomedical device 150 is then removed from the substrate support and transferred for further processing. Though the embodiments of FIGS. 2A-2I depict a plurality of layers 204, the biomedical device 150 may have more or fewer layers than shown in FIGS. 2A-2I, including no layers (i.e., no plurality of layers 204).

Figure 3:
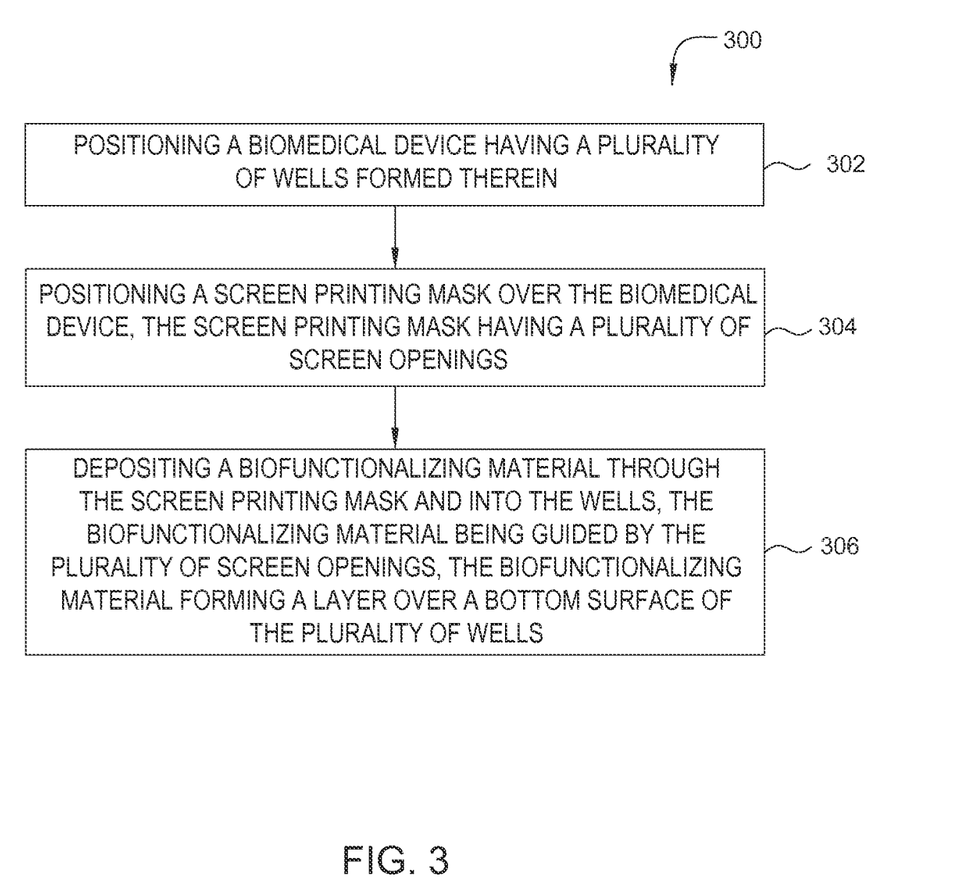
FIG. 3 is a block diagram of a method for deposition a biofunctionalizing material, according to an embodiment.

FIG. 3 is a block diagram describing a method 300 for deposition a biofunctionalizing material, according to an embodiment. The deposition of the biofunctionalizing material is controlled by extruding the biofunctionalizing material through the printing mask. The printing mask has numerous openings, which correspond to the openings in the substrate. Thus, the biofunctionalizing material is deposited in the wells without errant deposition on the top portions of the substrate. The method 300 includes positioning a biomedical device on a substrate support, the biomedical device having a plurality of wells formed therein, at 302; positioning a printing mask over the biomedical device, the printing mask having a plurality of mask openings, the plurality of mask openings corresponding to the plurality of wells, the printing mask forming a seal with the biomedical device, at 304; and depositing a biofunctionalizing material through the printing mask and into the wells, the biofunctionalizing material being guided by the plurality of mask openings, the biofunctionalizing material forming a layer over a bottom surface of the plurality of wells, at 306.

The method 300 begins by positioning a biomedical device on a substrate support, the biomedical device having a plurality of wells formed therein, at 302. The substrate support is part of or positioned in a process chamber. The substrate support and the process chamber can be the printing nests 131 and the screen print device 102, described with reference to FIG. 1. The biomedical device 150 corresponds to the biomedical device 150, depicted in FIG. 1 and FIGS. 2A-2I.

The substrate has a plurality of layers disposed thereon. The plurality of layers is described with reference to FIG. 2A-2I as four layers. The biomedical device further includes the dielectric layer, which is more clearly described with reference to FIGS. 2A-2I. The dielectric layer has a plurality of wells formed therein.

A printing mask is then positioned over the biomedical device, at 304. The printing mask, which is shown in FIGS. 2A-2I, is the printing mask 106 described with reference to FIG. 1. The printing mask may be positioned in contact with the upper surface of the biomedical device (e.g., dielectric layer 206) or over the biomedical device. The printing mask should allow for air exchange during the deposition of the biofunctionalizing material.

Once the printing mask is positioned over the biomedical device, a biofunctionalizing material is deposited through the printing mask and into the plurality of wells, at 306. The biofunctionalizing material may be delivered to the surface of the printing mask. The material may be delivered by jetting or otherwise flowing the material to the surface of the printing mask. The biofunctionalizing material is then guided by the plurality of mask openings into the wells. The biofunctionalizing material is extruded through the printing mask. Since the plurality of mask openings have a smaller opening area than the plurality of wells, the biofunctionalizing material is deposited primarily at the bottom of the corresponding well of the plurality of wells, without being deposited on the surface of the dielectric layer. The biofunctionalizing material will then react with the silanized layer to firmly adhere a biofunctionalizing layer to the surface of the silanized layer. The biofunctionalizing material can be forced through the printing mask, such as by using backside pressure.

Once the biofunctionalizing material is deposited, biological materials can be deposited therein. The biofunctionalizing material is a material used to provide a contact surface and buffer zone for biological materials, such as polynucleotides. In one example, the biofunctionalizing material is a hydrogel. In further examples, the biofunctionalizing material is a biological material, such as a polynucleotide, which is synthesized or incorporated into the lower surface of the well.

Polynucleotides (and other molecules) can be displayed on the surface of solid support through the use of hydrogel.

Molecular arrays, e.g. microarrays, of molecules, particularly polynucleotides, are of use in techniques including nucleic acid amplification and sequencing methods. In preparing hydrogel-based solid-supported molecular arrays, a hydrogel is formed and molecules displayed from it. The formation of the hydrogel and construction of the array may be effected sequentially or simultaneously.

Where the hydrogel is formed prior to formation of the array, it is typically produced by allowing a mixture of co-monomers to polymerize. Generally, the mixture of co-monomers contains acrylamide and one or more co-monomers, the latter of which permit, in part, subsequent immobilization of molecules of interest so as to form the molecular array. The co-monomers used to create the hydrogel typically contain a functionality that serves to participate in crosslinking of the hydrogel and/or immobilize the hydrogel to the solid support and facilitate association with the target molecules of interest.

As used herein, the term "polynucleotide" refers to nucleic acids in general, including DNA (e.g., genomic DNA, cDNA), RNA (e.g., mRNA), synthetic oligonucleotides and synthetic nucleic acid analogs. Polynucleotides may include natural or non-natural bases, or combinations thereof and natural or non-natural backbone linkages, e.g. phosphorothioates, PNA or 2'-O-methyl-RNA, or combinations thereof. The biological materials are immobilized by the hydrogel, such that the polynucleotides are unbound, exposed and widely distributed, thus allowing the polynucleotides to bind the complimentary DNA or RNA.

The above described method uses a printing mask to increase the precision in the deposition of biofunctionalizing material. By making the deposition more precise, less biofunctionalizing material is wasted while simultaneously removing chemical mechanical polishing or other cleaning steps. This, in effect, prevents possible mechanical damage to the substrate, decreases down time, and decreases the number of processing steps for the production of the biomedical device.

While the foregoing is directed to embodiments of the present methods and apparatus, other and further embodiments of the methods and apparatus may be devised without departing from the basic scope thereof, and the scope thereof is determined by the claims that follow.

What is claimed is:

1. A method of depositing a material, comprising:
positioning a biomedical device on a substrate support, the biomedical device having a plurality of wells formed therein;
positioning a printing mask over the biomedical device, the printing mask having a plurality of mask openings, the plurality of mask openings corresponding to the plurality of wells; and
depositing a biofunctionalizing material through the printing mask and into the wells, the biofunctionalizing material being guided by the plurality of mask openings, the biofunctionalizing material forming a layer over a bottom surface of the plurality of wells, wherein the biomedical device comprises a metal containing layer and a silicon-containing layer disposed over the metal containing layer, wherein the plurality of wells extend through the silicon-containing layer and stop at the metal-containing layer.

2. The method of claim 1, wherein the plurality of mask openings and the plurality of wells each have a circumference, and wherein the circumference of the mask opening is less than the corresponding circumference of the well.

3. The method of claim 1, wherein two or more mask openings of the plurality of mask openings correspond to each well in the plurality of wells.

4. The method of claim 1, wherein the printing mask is sealed against the biomedical device.

5. The method of claim 1, further comprising depositing a silanized layer at the bottom of each of the plurality of wells prior to depositing the biofunctionalizing material.

6. The method of claim 1, wherein the biofunctionalizing material is a hydrogel.

7. The method of claim 1, wherein the biofunctionalizing material is delivered through the printing mask by either screen printing or masked jetting.

8. A method of depositing a material, comprising:
positioning a biomedical device on a substrate support, the biomedical device having a plurality of wells;
aligning a printing mask over the biomedical device, the printing mask having a plurality of mask openings, the mask openings corresponding to and aligning with at least one of the plurality of wells;
forming a seal between the printing mask and the biomedical device;
coating the printing mask with a biofunctionalizing material; and
extruding the biofunctionalizing material through the plurality of mask openings, the mask openings being positioned to deposit the biofunctionalizing material into the wells, wherein the biomedical device comprises a metal containing layer and a silicon-containing layer disposed over the metal containing layer, wherein the plurality of wells extend through the silicon-containing layer and stop at the metal-containing layer.

9. The method of claim 8, wherein the plurality of mask openings and the plurality of wells each have a circumference, and wherein the circumference of the mask opening is less than the corresponding circumference of the well.

10. The method of claim 8, wherein two or more mask openings of the plurality of mask openings correspond to each well in the plurality of wells.

11. The method of claim 8, wherein the printing mask is sealed against the substrate.

12. The method of claim 8, further comprising depositing a silanized layer at the bottom of each of the plurality of wells prior to depositing the biofunctionalizing material.

13. The method of claim 8, wherein the biofunctionalizing material is a hydrogel.

14. The method of claim 8, wherein the mask opening is centrally positioned in relation to the wells.

15. A method of depositing a material, comprising:
positioning a biomedical device on a substrate support, the biomedical device having a plurality of wells formed therein, the biomedical device comprising a plurality of layers with a top layer being a silicon-containing layer, the plurality of wells extending through at least the silicon-containing layer, each of the plurality of wells having a first width, a first length and comprising a silanized layer formed on a bottom surface of the plurality of wells;
positioning a printing mask over the biomedical device, the printing mask having a plurality of mask openings, the plurality of mask openings corresponding to the plurality of wells, wherein the plurality of mask openings and the plurality of wells each have a circumference, and wherein the circumference of the mask opening is less than the corresponding circumference of the well; and depositing a hydrogel through the printing mask and into the plurality of wells, the hydrogel being guided by the plurality of mask openings, the hydrogel forming a layer over the silanized layer in the plurality of wells.

16. The method of claim 15, wherein the printing mask forms a seal with the silicon-containing layer of the biomedical device.

17. The method of claim 15, wherein two or more mask openings of the plurality of mask openings correspond to each well in the plurality of wells.

18. The method of claim 15, wherein the biomedical device comprises a metal containing layer disposed under the silicon-containing layer, wherein the plurality of wells extend through the silicon-containing layer and stop at the metal-containing layer.

19. A method of depositing a material, comprising:
positioning a biomedical device on a substrate support, the biomedical device having a plurality of wells formed therein;
positioning a printing mask over the biomedical device, the printing mask having a plurality of mask openings, the plurality of mask openings corresponding to the plurality of wells; and
depositing a biofunctionalizing material through the printing mask and into the wells, the biofunctionalizing material being guided by the plurality of mask openings, the biofunctionalizing material forming a layer over a bottom surface of the plurality of wells, wherein the biofunctionalizing material is a hydrogel.

20. A method of depositing a material, comprising:
positioning a biomedical device on a substrate support, the biomedical device having a plurality of wells;
aligning a printing mask over the biomedical device, the printing mask having a plurality of mask openings, the mask openings corresponding to and aligning with at least one of the plurality of wells;
forming a seal between the printing mask and the biomedical device;
coating the printing mask with a biofunctionalizing material; and
extruding the biofunctionalizing material through the plurality of mask openings, the mask openings being positioned to deposit the biofunctionalizing material into the wells, wherein the biofunctionalizing material is a hydrogel.

* * * * *